(No Model.)
3 Sheets—Sheet 1.

E. F. MOWER
SETTING-UP OR MARKING MACHINE FOR BOOTS OR SHOES.

No. 584,597.
Patented June 15, 1897.

Witnesses:
Oscar F. Hill
Edith J. Anderson

Inventor:
Edwin F. Mower
by Macleod Calvert Randall
Attorneys.

(No Model.)

3 Sheets—Sheet 2.

E. F. MOWER.
SETTING-UP OR MARKING MACHINE FOR BOOTS OR SHOES.

No. 584,597.

Patented June 15, 1897.

(No Model.)  E. F. MOWER.  3 Sheets—Sheet 3.
SETTING-UP OR MARKING MACHINE FOR BOOTS OR SHOES.

No. 584,597.   Patented June 15, 1897.

UNITED STATES PATENT OFFICE.

EDWIN F. MOWER, OF BOSTON, MASSACHUSETTS.

SETTING-UP OR MARKING MACHINE FOR BOOTS OR SHOES.

SPECIFICATION forming part of Letters Patent No. 584,597, dated June 15, 1897.

Application filed December 21, 1896. Serial No. 616,393. (No model.)

*To all whom it may concern:*

Be it known that I, EDWIN F. MOWER, a citizen of the United States, residing at Boston, in the county of Suffolk and State of Massachusetts, have invented certain new and useful Improvements in Setting-Up or Marking Machines for Boots or Shoes, of which the following is a specification, reference being had therein to the accompanying drawings.

The invention will be described first with reference to the accompanying drawings, after which the distinguishing characteristics thereof will be particularly pointed out and distinctly defined in the claims at the close of this specification.

Figure 1:
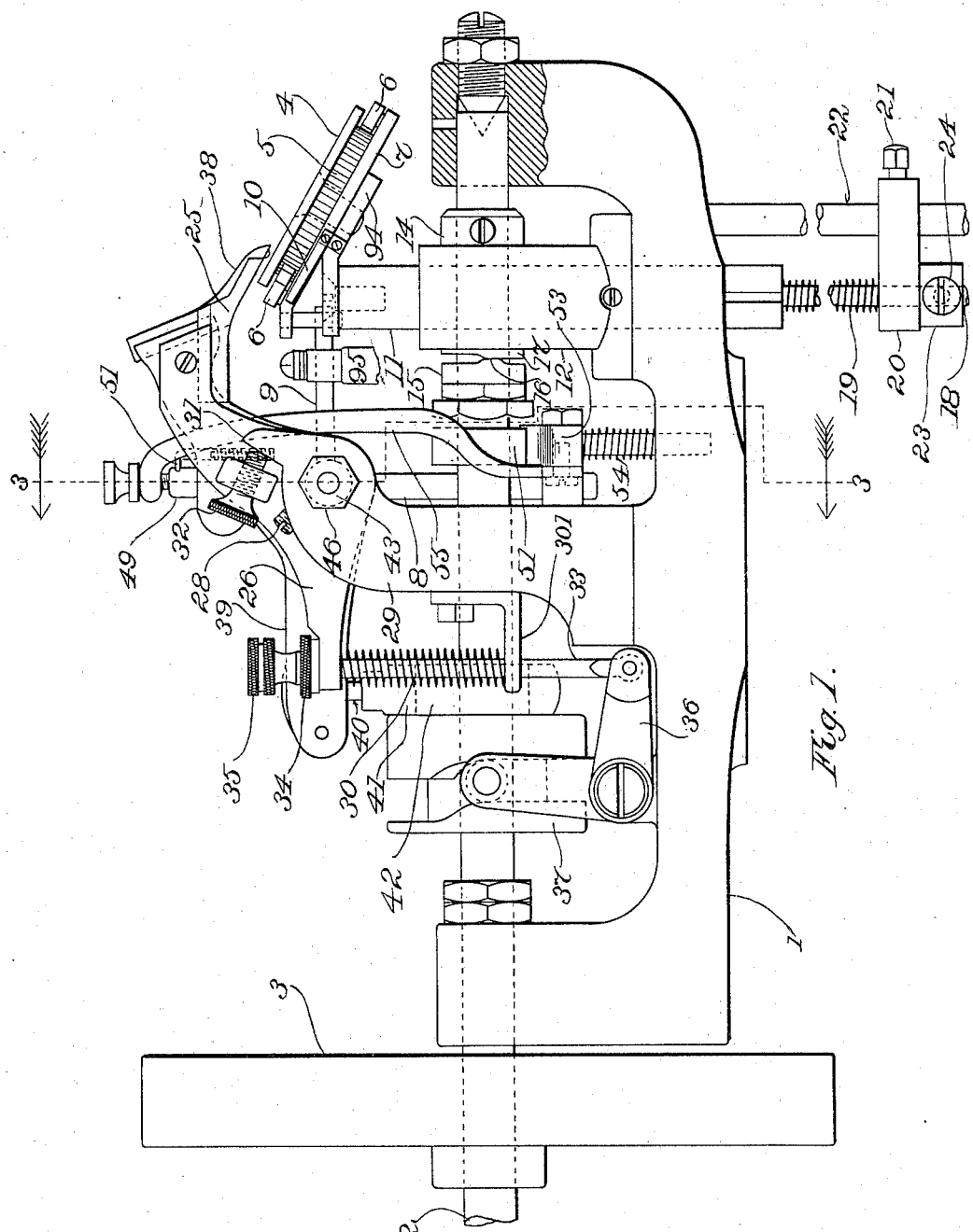
Figure 2:
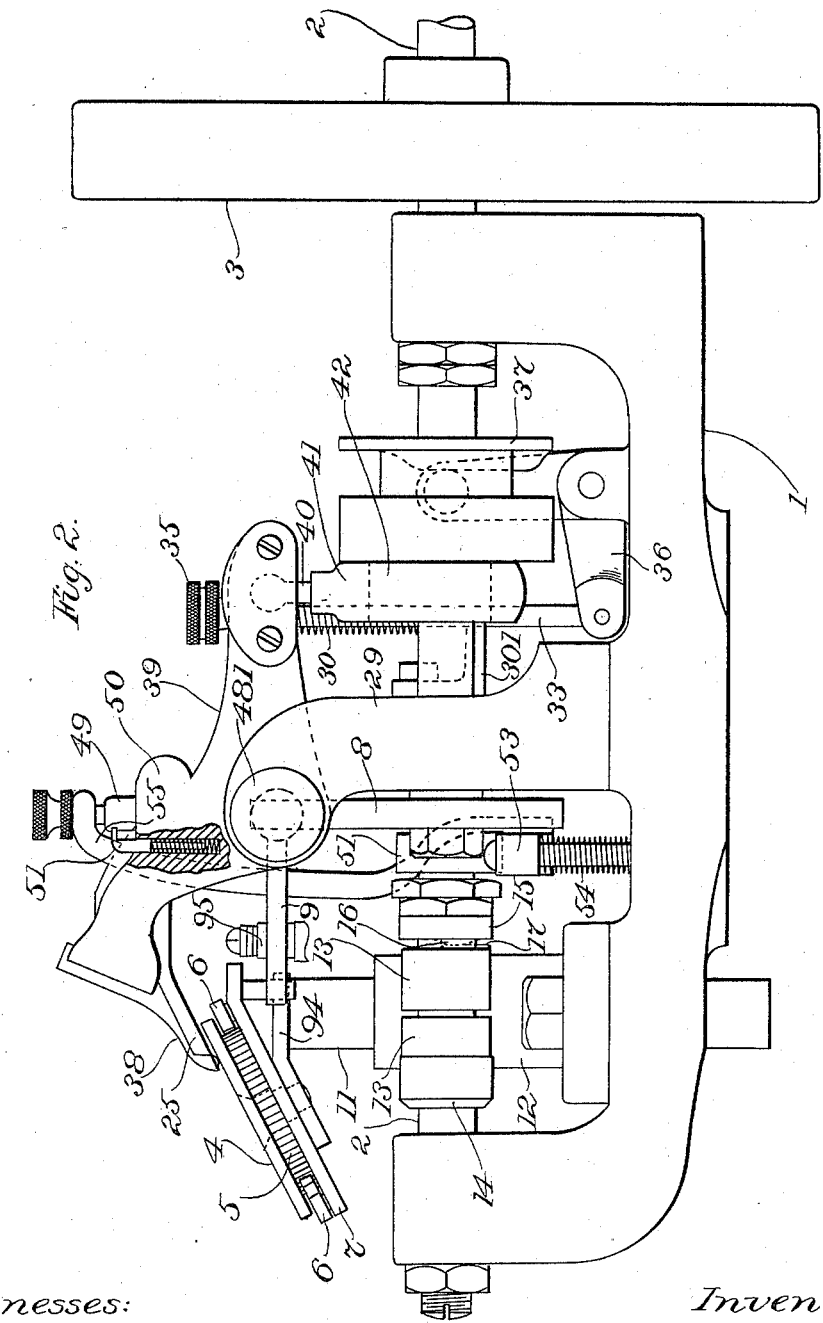
Figure 3:
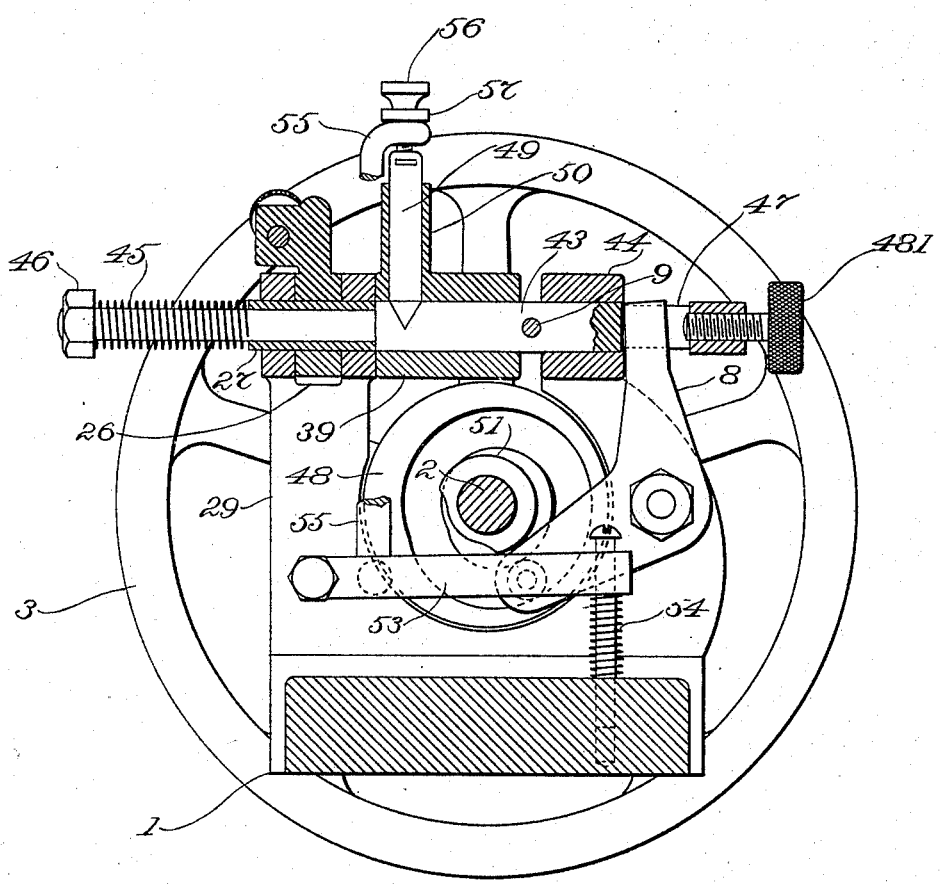

Figure 1 of the drawings shows my improved machine in side elevation, looking at the machine from the left-hand side in Fig. 3, a small portion being represented in vertical section. Fig. 2 is a view in side elevation of the said machine, looking at the latter from the right-hand side in Fig. 3. Fig. 3 is a view in vertical section on line 3 3 of Fig. 1, looking in the direction of the arrows at the ends of such line.

At 1 is the framework of the machine, at 2 the driving-shaft, and at 3 the band-wheel on the said shaft. From the said shaft the various operative parts are actuated, as hereinafter set forth.

4 is the work-rest, it consisting of a disk which is arranged to turn on an oblique axis on the downwardly-inclined plate 94, as in my Letters Patent No. 567,251. Fast with the work-rest 4 is the ratchet-wheel 5, the latter being engaged by the pawl or pawls 6, these being mounted upon a movable pawl-carrier 7, which latter is operated in one direction by a projecting pin 9, that contacts with the said pawl-carrier, the said pin being fixed upon the spindle 43, hereinafter described, the pawl-carrier being operated in the reverse direction by a spring 10, that is attached to the plate 94. The said plate 94 is mounted upon the upper end of the work-post 11, which latter passes through a guide and holder 12. The latter is provided with a split clamp, as shown most clearly in Fig. 2 and substantially as in my Letters Patent No. 563,871, the lugs of the said split clamp being shown at 13 13 in Fig. 2. Through holes in these lugs the driving-shaft 2 passes, it having fixed thereon the plain collar 14 at one side of the said lugs and in contact with the adjacent lug. At the opposite side of the said lugs the said shaft 2 has fast thereon the collar 15, the latter being formed at the side thereof with a cam 16, which as shaft 2 rotates acts against a side cam 17, that is provided on the adjacent lug 13. While cam 16 bears upon the side cam 17, it holds the split clamp closed upon the work-post 11 and thereby keeps the said work-post, together with the parts that are mounted thereon, immovable in a vertical direction while the setting-up and marking tool is acting upon the work.

18 is a rod extending downwardly from the work-post 11 and intended to have in practice a treadle or other device connected thereto, whereby to enable the work-post and work-rest to be drawn downward when it is desired to insert the edge of the sole of a shoe between the said work-rest and the presser-foot.

19 is a spring which at its upper end acts against the lower end of the work-post 11, while at its lower end the said spring bears against a block 20, that is fixed at the desired height by means of a clamping-screw 21 upon a vertical rod 22, that is attached to the framework 1.

23 is a stop consisting of a block which is secured at the desired height upon the rod 18 by means of a clamping-screw 24. The said stop 23 limits the extent to which the work-rest 4 is raised by the action of the spring 19.

At 25 is the presser-foot, which latter engages with the upper surface of the work while the latter is in position on the work-rest 4, the said presser-foot being attached to the carrying-lever 26, which is mounted to turn freely on the outer surface of the sleeve or bushing 27, (see Fig. 3,) which is fixed by means of the clamping-screw 28, Fig. 1, in the ears that are formed on the upper end of the stand 29, the latter forming part of the framework 1. The hub of the lever 26 enters between the said ears of the stand 29, as shown clearly in Fig. 23. A spiral spring 30 acts on the lever 26 with a tendency to carry the presser-foot 25 toward the work-rest 4, the limit of the movement in this direction being determined by means of the abutment 31 on stand 29 and the set-screw 32, that is applied to lever 26. The said spring 30 is shown interposed between the tail of lever 26 and the lug 301 on stand 29. For the purpose of raising the presser-foot 25 automatically at required times to facilitate the feeding of the work forward by the intermittent movements of the work-rest a rod 33 is passed through a hole in the lug 301, through the interior of the spring 30, and through a hole in the tail of the lever 26 and receives on its threaded upper end above the said tail the adjusting-nut 34 and the lock-nut 35. The lower end of the said rod 33 is joined pivotally to the horizontal arm of a bell-crank 36, the vertical arm of which carries a pin or roller that enters the groove of a cam 37, that is fast upon the shaft 2. The said groove is shaped properly to cause the presser-foot to be raised from the surface of the work at the required times. The spring 30 acts to depress the presser-foot upon the surface of the work again. It is stronger than the spring 19, which upholds the work-post 11 and work-rest 4, and consequently when allowed to act to depress the presser-foot the latter operates through the work to depress the work-rest and its support to an extent which is determined by the thickness of the sole that is in contact with the upper surface of the work-rest. The work-rest is held locked in the depressed position by the action of the split clamp, being released after the tool 38 has been caused to act upon the work and has risen again.

38 is the tool which is employed for the purpose of setting up the stitches in the work or of setting up the said stitches and in addition marking the upper surface of the sole of the shoe that is being operated upon. The working end of the said tool 38 will be shaped according to the duty that it is required to perform. The tool 38 is applied to the forward end of the lever 39, the rear end of which has joined pivotally thereto the rod 40, extending from the strap 41 of the eccentric 42, which latter is fast on the shaft 2. By means of the said eccentric and connections the tool 38 is moved toward and from the work.

A lateral traverse is communicated to the lever 39 and tool 38 in the following manner: The lever 39 is sleeved upon the spindle 43, (see Fig. 3,) which latter passes through a bearing that is provided therefor in the stand 44 and also through the bushing 27. The portion of the spindle 43 which passes through the said bushing and projects beyond the latter is reduced in diameter, as shown in Fig 3, and receives on the said reduced portion a spiral spring 45, which is compressed between one end of the sleeve 27 and a nut 46, which is fitted upon the threaded end of the spindle 43. The tool-carrying lever 39 engages with the said spindle 43 in a manner which causes the said lever and spindle to move in unison in a direction which is transverse with relation to the lever—that is to say, lengthwise of the spindle. In many cases any convenient known means or method may be adopted for the purpose of producing the desired engagement of the lever and spindle. I have shown and will hereinafter describe one means of effecting the engagement which may be employed, if desired. The spring 45 acts with a tendency to carry the spindle 43 and tool-carrying lever 39 to the left in Fig. 3. For the purpose of moving the spindle and tool-carrying lever in the opposite direction I employ the lever 8, one arm of which plays in the slot 47 that is made through the spindle 43, the other arm of the said lever being provided with a pin or roller which works in the groove of a cam 48 that is fast upon the shaft 2. Considerable variation is found to occur in the stitches that are formed around the edges of the soles of boots and shoes. Not only will there be found a difference between the length of the stitches around the soles of two separate boots or shoes, but differences will be found to exist in the lengths of the stitches in the sole of a single boot or shoe. This must be compensated for as the work is being presented to the action of the tool 38, so that the said tool always shall enter properly between every two adjacent stitches—that is to say, it is necessary to provide means whereby to permit of a variation from time to time in the extent of the lateral movement of the tool-carrying lever and tool, so as to conform to the variations in the lengths of the stitches in the work. To this end I provide means which shall enable the operative to vary the length of the lateral stroke aforesaid as and when he perceives this to be necessary during the operation of the machine. I have shown a set-screw 481, having the stem thereof fitted to a threaded hole in the end of the spindle 43, the end of the said set-screw projecting into the path of movement of the lever 8. By the engagement of the said lever with the end of the set-screw the movement of the spindle and tool-carrying lever to the right in Fig. 3 is occasioned. By turning the set-screw from time to time the length of the movement which is derived from the lever 8 may be varied so as to cause the tool 38 in every descent thereof to pass correctly and with exactness down into the space between two stitches in the work.

Inasmuch as it may be deemed desirable in some cases to render the tool 38 yielding and automatically adjustable, I provide therefor as follows: The engagement of the hub of the tool-carrying lever 39 with the spindle 43 in such cases is secured by means of a pin or bolt 49, (shown most clearly in Fig. 3,) the inner end of which is tapering—i. e., cone-shaped or wedge-shaped—and enters a correspondingly-shaped recess in the spindle 43. This pin or bolt 49 is fitted within a nipple 50, provided on the hub of the lever 39. A spring-actuated pin 51, applied to the lever 39, engages with the pin or bolt 49, as indicated in Fig. 1, and thereby the said pin or bolt 49 normally is held in a slightly retracted position, thereby partially withdrawing the pointed inner end of the pin or bolt from the recess in the spindle 43. This permits sufficient play of the tool-carrying lever 39 upon the spindle 43 to provide for the automatic adjustment of the tool to suit the length of the stitches in the work which is referred to above. For the purpose of locking the tool-carrying lever to the spindle during the movement by which the feed of the work is occasioned I employ a cam 51, which is fast upon the shaft 2, the raised portion of the said cam acting to depress a lever 53 against the upward pressure of a spring 54, the said lever having pivoted thereto a link 55, which latter has passed through a hole in its laterally-bent upper end the stem of a set-screw 56, which engages with the outer end of the pin or bolt 49. 57 is a lock-nut that is applied to the set-screw 56. For the sake of clearness the greater part of the length of the link 55 is broken out in Fig. 3. When lever 53 is depressed, as aforesaid, the pin or bolt 49 is forced inwardly and locks the tool-carrying lever 39 rigidly to the spindle 43, so that for the time being there is no play or lost motion between the two.

As is well known by those who are skilled in the art, the thread which is used for the stitching around the edges of the soles of boots and shoes is waxed. Inasmuch as when a boot or shoe is in position upon the work-rest 4 and being operated upon by the machine the working end of the tool 38 in every descent of the said working end is caused to bear against the proximate portions of two stitches and is forced down between the said proximate portions, I find that the tool performs its work more readily and meets with less resistance when heated, so that by its contact with the waxed thread of the stitches the wax which impregnates or coats the said thread shall become partially melted. When the tool is thus heated and the wax in turn is melted, the movement of the working end of the said tool upon the thread and the depression of the working end between the proximate portion of two adjacent stitches is accomplished much more easily and with less resistance from adhesion to the waxed thread and friction. Furthermore, the working end of the tool finds its way much more readily into the intervening space between two adjacent stitches.

I provide for the heating of the tool 38 in any convenient manner. It is common in wax-thread sewing-machines and the like machines to provide for heating the parts over or through which a waxed thread passes on its way to the work. Therefore it will be obvious that the heating may be effected in various known or suitable ways. A convenient arrangement which I have shown in the drawings consists of a small gas-jet (shown at 95) located beneath the forward end of the tool-carrying lever 39. The heat from the lighted jet of gas acts to warm the said forward end of the lever 39 and by conduction the tool itself is heated. I do not limit myself to the use of any particular means of heating the tool.

I claim as my invention—

1. The combination with the tool 38 of a setting-up or setting-up and marking machine, the tool-carrying lever, and means to vibrate the said lever, of the spindle on which the said lever is mounted, the lever to move the spindle lengthwise to occasion the feed movement of the tool, an adjusting-screw whereby to vary the length of the feed movement in the course of the operation of the machine, and means to actuate the lever last mentioned, substantially as described.

2. The combination with the tool 38, the tool-carrying lever, and means to vibrate the said lever, of the spindle on which the said lever is mounted loosely, means to move the said spindle lengthwise, a device connecting said lever to said spindle with play or lost motion to enable the tool to adjust itself automatically to the spaces between the stitches in the work, and means whereby to lock the lever and spindle rigidly together during the feed movement, substantially as described.

3. The combination with the tool 38, the tool-carrying lever, and means to vibrate the said lever, of the spindle on which the said lever is mounted loosely, a pin applied to said lever and having a wedge-shaped or cone-shaped end entering a recess in the said spindle and normally allowing play or lost motion between the lever and spindle, to enable the tool to adjust itself automatically to the spaces between the stitches in the work, and means acting upon said pin to force it home into said recess and lock the lever and spindle rigidly together during the feed movement of the tool, substantially as described.

4. The combination with the tool 38, the lever carrying the same, and means to vibrate the said lever, of the spindle on which the said lever is mounted loosely, a pin applied to the said lever and having a wedge-shaped or cone-shaped end entering a recess in the said spindle and normally allowing play or lost motion between the lever and spindle to enable the tool to adjust itself automatically to the spaces between the stitches in the work, the link 55, the lever 53, and the actuating-cam for said lever, substantially as described.

5. The combination with the setting-up or setting-up and marking tool 38 and its actuating devices, of means to heat the said tool, substantially as described.

In testimony whereof I affix my signature in presence of two witnesses.

EDWIN F. MOWER.

Witnesses:
CHAS. F. RANDALL,
WILLIAM A. COPELAND.